Nov. 10, 1953 J. F. COALES ET AL 2,659,072

DATA TRANSMISSION SYSTEM FOR DIGITAL CALCULATING MACHINES OR THE LIKE

Filed Jan. 13, 1949 8 Sheets-Sheet 1

Inventors:
John F. COALES
William Sidney ELLIOTT
Norman Douglas HILL
Samuel Edwin HERSOM
John TINDALE By [signature]
Attorney Nov. 10, 1953

J. F. COALES ET AL

DATA TRANSMISSION SYSTEM FOR DIGITAL CALCULATING MACHINES OR THE LIKE 2,659,072

Filed Jan. 13, 1949

8 Sheets-Sheet 2

Inventors: John F. COALES
William Sidney ELLIOTT
Norman Douglas HILL
Samuel Edwin HERSOM
John TINDALE By Attorney Inventors:
John F. COALES
William Sidney ELLIOTT
Norman Douglas HILL
Samuel Edwin HERSOM
John TINDALE
By [signature] Attorney Inventors:
John F. COALES
William Sidney ELLIOTT
Norman Douglas HILL
Samuel Edwin HERSOM
John TINDALE
By Attorney Inventors:
John F. COALES
William Sidney ELLIOTT
Norman Douglas HILL
Samuel Edwin HERSOM
John TINDALE
By [signature]
Attorney Nov. 10, 1953 J. F. COALES ET AL 2,659,072

DATA TRANSMISSION SYSTEM FOR DIGITAL CALCULATING MACHINES OR THE LIKE

Filed Jan. 13, 1949 8 Sheets-Sheet 6

INVENTORS:
John F Coales, William S Elliott, Norman D Hill, Samuel E Hersom, John Tindale.

by: [signature] Atty.

Nov. 10, 1953

J. F. COALES ET AL

DATA TRANSMISSION SYSTEM FOR DIGITAL CALCULATING MACHINES OR THE LIKE 2,659,072

Filed Jan. 13, 1949

8 Sheets-Sheet 7

Inventors:
John F Coales
William S Elliott
Norman D Hill
Samuel E Hersom
John Tindale by: [signature]

Attorney.

Inventors:
John F Coales, William S
Elliott, Norman D Hill,
Samuel E Hersom, & John Tindale
by: [signature]
Attorney.

Patented Nov. 10, 1953

2,659,072

UNITED STATES PATENT OFFICE 2,659,072

DATA TRANSMISSION SYSTEM FOR DIGITAL CALCULATING MACHINES OR THE LIKE

John F. Coales, Radlett, William Sidney Elliott, Boreham Wood, Norman Douglas Hill, Watford, Samuel Edwin Hersom, Thorpe Bay, and John Tindale, Edgware, England Application January 13, 1949, Serial No. 70,764

10 Claims. (Cl. 340—354)

This invention concerns data transmission systems for use, for example, with digital calculating and like logical machines for converting input data or information into a resultant output which may be in the form of an electrical signal or of a mechanical motion. The input data or information from, say, a movable member is, at least in part, converted into digital form, i. e. in the form of discrete phenomena or states of devices, or in the form of sequences of discrete events, and means is provided for interpreting the transmitted data in a convenient form, for example as a movement of a controlled part or as a numerical or mathematical result.

The representation of data or information by discrete states of devices means that a device can only represent given data when in a steady state which is definite and distinct from any other such state which the device may assume, and that the relationship between a steady state and the corresponding data or information is unique, i. e. the said data or information cannot be represented by any other steady state of the device. Furthermore, the transition between one steady state and another represents no intelligible information.

As examples of systems employing digital representation of data may be quoted electronic calculating machines in which the data to be operated upon is represented by electrical pulses, which operate suitable devices, the presence of a pulse causing the device to change from one steady state to another and the absence of a pulse leaving the device unchanged. Another example of such a system is the mechanical transmission of information by discrete linear or angular displacements of mechanical elements to one or another of a plurality of definite positions or attitudes.

The data or information may be represented either by the combination at any instant of the simultaneous states of all of a group of separate devices, or by the sequential states of a single device. Thus, for example, where the data is a number in the binary system, or scale of two, in which only the digits 0 and 1 occur, the number 2 in the normal decimal scale corresponds to the number 10 in the binary scale, and may be represented by the simultaneous states of two devices, the first of which is in the 1-state and the second in the 0-state. Similarly the decimal scale number 3 is represented by both devices being simultaneously in the 1-state, and the decimal number 4 by three devices the first of which is in the 1-state and the other two in the 0-state. The devices may, alternatively, have three possible steady states, such as the "+1 state," the "0 state" and the "−1 state," or alternatively the "full-on," the "half-on," and the "off" states. Such devices can be used to represent decimal scale numbers in the ternary scale which possesses only the digits 0, 1 and 2. Systems which employ the simultaneous states of different devices are commonly termed "parallel" systems, and require as many separate channels as there are digits in the highest number to be indicated, whilst systems which employ the sequential states of one device are commonly termed "series" systems.

In both systems, data is commonly transmitted from an input or source to an output by way of one or more channels in the form of pulses which may have a variety of physical forms—usually electrical or mechanical in nature, although pulses of an optical, magnetic or any other nature could be employed if desired. The absence of a pulse, in the ordinary significance of the term, on any significant channel or at any significant instant, may represent a digit—say the digit 0—in the appropriate place in a number, and may also be regarded as the "pulse" or like phenomenon in the same way as that which represents the digit 1, since it has a discrete and unique interpretation.

From this it follows that, if a digit—say, 0—is to be represented by the absence of a pulse in a significant place in the pattern, the corresponding marking may be physically indistinguishable from its general background—for example, if the markings appear on an opaque strip or disc, a marking representing the digit 0 is constituted by a significant zone of the surface of the strip or disc which may not be specifically defined by a boundary. The term "marking" is to be understood as including such a significant, though physically undefined, zone. It will, however, be appreciated that such a marking may be used to indicate some control function. For example, in a binary system of numbers, a non-reflecting opaque strip or disc may carry transparent and reflecting markings representing the digits 0 and 1 respectively, or vice-versa, whilst a non-reflecting zone may be used to indicate an error or some control signal.

In this specification, the term "marking" will be used to signify any durable discrete phenomenon which is capable of identification and presentation as an event to which a unique interpretation can be assigned. The process of identification and presentation will be termed herein "reading," and the term "durable" is intended to indicate that the marking is not destroyed or changed by the reading process. An event may be constituted by an electrical pulse or a mechanical displacement or any other perceptible occurrence such as an optical or audible effect. A group or train of pulses will be understood to include the case of a single pulse or the absence of a pulse in a single significant place where such a single significant place has a definite or discrete interpretation.

The present invention is primarily concerned with the generation of pulse trains which represent, in digital form, the data to be transmitted. This data may have any desired significance, but frequently represents the instantaneous position of a movable member, or the value of a function such as a trigonometrical ratio of an angular displacement of a rotatable member.

It is an object of the present invention to provide a form of generator which is simple and efficient and by which a large range of values of a variable can be represented.

It is broadest aspect the invention provides a digital data transmission system comprising a pattern composed of groups of markings, means for reading each marking as a corresponding digital signal and means for interpreting the said digital signals, each group of markings representing a value of a desired function of the position of the pattern relative to the reading means.

Preferably, a marking is constituted by a change in a characteristic of a surface, and the reading means comprises means for detecting and responding to the said change.

The change may be of an optical nature, and the reading means may comprise a light sensitive element responsive to the optical change. Thus, for example, the pattern may comprise a plurality of transparent markings on a generally opaque ground or vice-versa. The reading means may then comprise a light source and a light sensitive element located on opposite sides of the pattern, and means is provided for causing relative movement between the pattern and the reading means. It will be clear that the markings may alternatively be of a reflecting character on a non-reflecting ground, or vice-versa; or a combination of reflecting and transparent markings on a light-absorbing ground may be used. The latter arrangement is of particular advantage where the data is represented by digits on the ternary scale.

The invention will be more clearly understood from the following descriptions, given by way of example only, of various embodiments thereof, reference being directed to the accompanying drawings in which:

Figure 1 illustrates a pattern of discrete markings which represent on the binary scale the digits $-15$ to $+15$;

Figure 1*a* shows an alternative arrangement of the left hand part of the pattern of Figure 1 for representing a negative number by a complement;

In the following description, the circuit diagrams in block form will first be described as a whole, typical detail circuits of each block being later described with reference to Figs. 17 to 24. Each block is identified with the corresponding detail circuit by the reference thereon to the appropriate figure (or figures, where two detail circuits are combined in one block).

Throughout the following description with reference to Fig. 1–24 the data transmission system concerned is of the electronic type in which the data is in the form of binary numbers or "words" which are transmitted as discrete electrical pulses which are derived initially from a pulse train generator. The pulses required to represent a binary number or "word," together with any pulses constituting operation instructions, are selected by means of a pulse distributor and gated by pulses from a photo-cell, the illumination of which is varied in accordance with the markings on a relatively movable pattern. The markings are scanned transversely to the direction of relative motion by a light beam.

Figure 12:
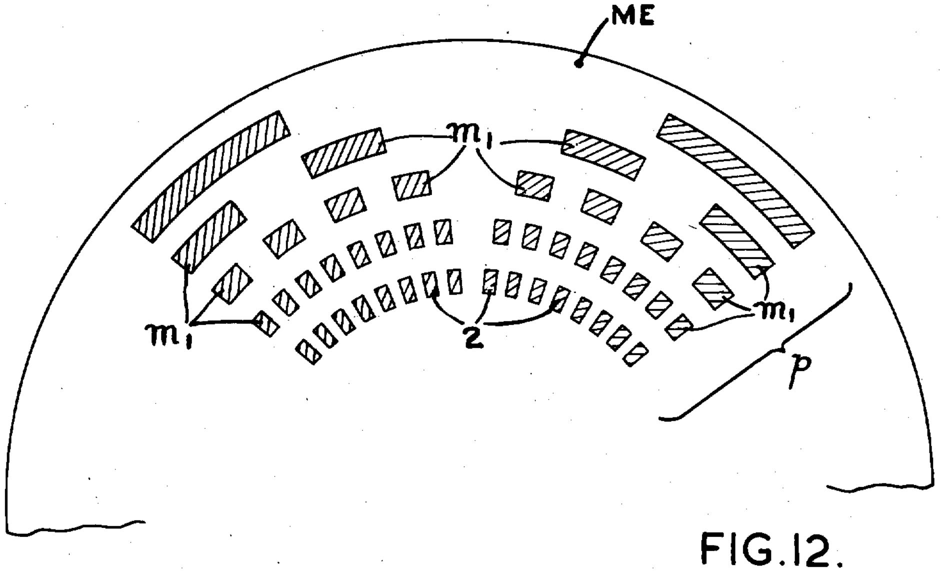
Figure 12 is a fragmentary illustration to a larger scale of the disc employed in the arrangement of Figure 11.
Figure 11:
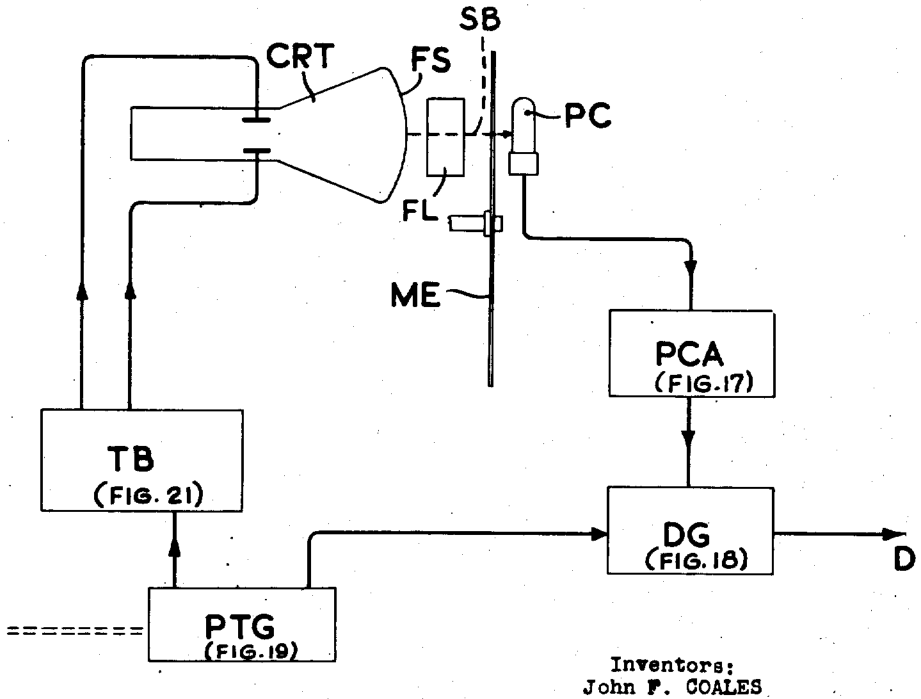
Figure 11 is a simplified block diagram of a typical circuit for an electronic data transmission system for indicating at a distance the angular position of a disc.

The general principles of operation will be more clearly understood by reference to Fig. 11 which shows a simplified circuit for transmitting to a receiver (not shown) digital data in the form of binary numbers or "words" representing the position of a movable element ME such as the rotatable disc which is illustrated fragmentarily on an enlarged scale in Fig. 12. The disc ME is here assumed to be generally opaque, and is provided with a pattern $p$ of transparent markings $m_1$ described more fully below which are scanned radially by a light beam SB derived from the fluorescent screen FS of a cathode ray tube CRT by way of a focusing lens FL. The light beam SB falls on the photocell PC, the output from which is in the form of pulses corresponding to the markings and is fed to an amplifier PCA and thence to a digit pulse gating circuit DG. A clock pulse train generator PTG continuously generates pulses of equal magnitude at regular intervals which are fed to the gate DG, those which coincide with the output pulses from the amplifier appearing in the output from the gating circuit DG. Trigger pulses are also derived from the pulse train generator PTG for triggering the time base circuit TB.

Figure 1:
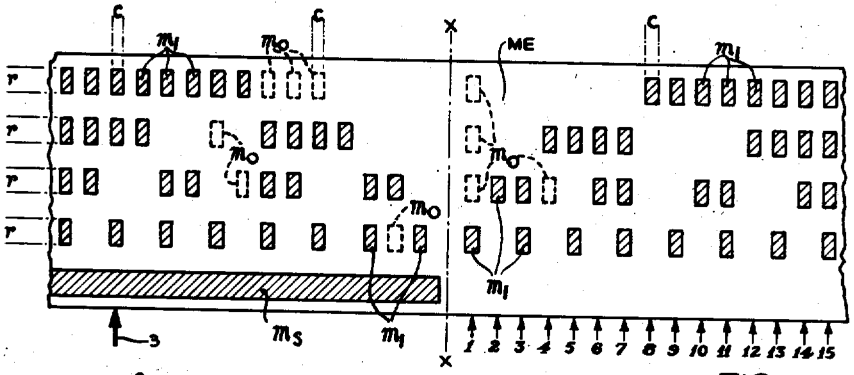
Figure 1A:
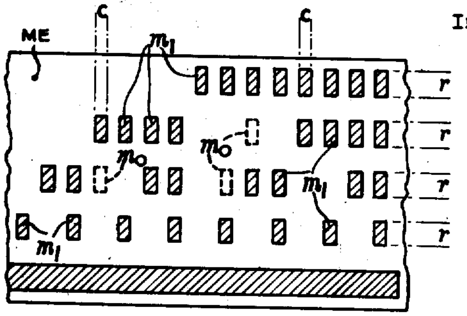

Referring to Fig. 1 of the drawings, a number of transparent markings $m_1$, arranged in vertical columns $c$ and horizontal rows $r$, are applied to an opaque strip or tape ME which is to be traversed in the direction of its length past a scanning position where the scanning light beam SB (Fig. 11) is caused to fall upon the strip. The beam scans in the direction of the arrow 3, and, where it encounters a transparent marking $m_1$, light is transmitted to the photocell PC (Fig. 11), to cause a pulse in the output circuit. Each intersection of a column $c$ and a row $r$ represents a significant place in a binary number to be transmitted, there being as many columns $c$ as there are numbers in a pattern, and as many rows $r$ as there are digits in each number.

Each marking $m_1$ represents the digit 1, whilst the absence of a marking in a significant place (indicated, for example, in dotted lines at $m_0$) represents the digit 0. Thus, the absence of a marking $m_1$ at a significant place in which, in another number, a marking $m_1$ may appear, has equal significance with the presence of such a marking, and is regarded in this specification as a marking. Only a few of the total number of markings $m_0$ in the pattern are indicated on the drawing, as will be understood.

The markings $m_0$, $m_1$ are shown arranged in a series of columns $c$ (only a few of which are actually referenced on the drawing). The columns $c$ are disposed symmetrically about the axis X—X except that an additional sign marking $m_s$ appears at the foot of the vertical columns $c$ to the left of the axis X—X. This sign marking $m_s$ is thus traversed by the scanning light beam SB before any column of markings $c$ is scanned, and is used to indicate that the binary number represented by the photocell output is negative. Each column of markings $c$ represents on the binary scale a corresponding number of the series 0–15, as shown by the numbers appearing below the right hand portion of Fig. 1. The position of the axis X—X represents zero.

It will be seen that in scanning the pattern of Figure 1, the least significant digit is transmitted first in time. This arrangement is for the convenience of the later computing stages as will be appreciated by those skilled in the art. In writing numbers in the binary scale, the usual convention of placing the most significant digit first will be adopted throughout this specification.

In a circuit arrangement of a calculating machine employing a pattern of the kind shown in Fig. 1, it would be customary to arrange that a pulse in the photocell output at any instant when the scanning beam traverses the sign marking $m_s$ is not recorded as the first digit of a number but serves to indicate, in a later stage, that the subsequent digit pulses represent a negative number. Where the beam sweeps a column to the right of the axis X—X, no pulse occurs in the photocell output for the duration of the sign gating pulse so that the subsequent digit pulses represent a positive number.

In certain calculating machines it may be convenient to employ the complement of a number instead of the modulus of a negative number preceded by the negative sign. In this case, a pattern as shown in Figure 1$a$ is used, the sign marking $m_s$ then indicating that the subsequent series of digits represents a complement.

Figure 2:
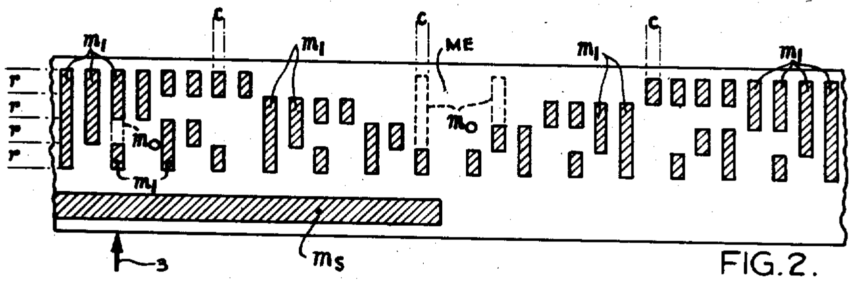
Figure 2 shows the pattern of Figure 1 but with adjacent markings in each vertical column coalesced.

Fig. 2 illustrates an alternative form of pattern corresponding to that shown in Fig. 1 but in which all the adjacent markings representing the same digit value in each column $c$ are coalesced to form a single continuous marking $m_0$, $m_1$—i. e. the rows $r$ are contiguous. In this case, the photocell output operates a gating circuit to permit the passage of an appropriate number of digit pulses (according to the length of a marking $m_1$), which are selected from a continuous train of "clock" pulses produced by a clock pulse train generator. This arrangement enables a narrower strip ME to be employed without involving undue complication in the circuit arrangements.

Figure 3:
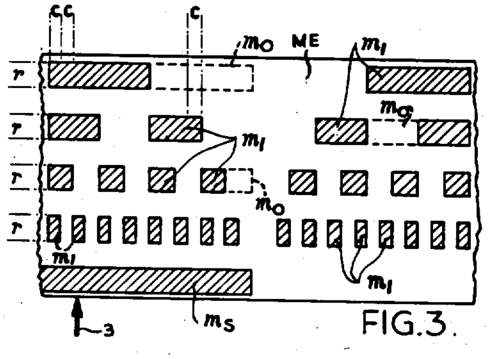
Figure 3 shows the pattern of Figure 1 but with the adjacent markings in each horizontal row coalesced.

Fig. 3 illustrates a further alternative form of pattern in which all the adjacent markings representing the same digit value in a row $r$ are coalesced to form the markings $m_0$, $m_1$—i. e. the columns $c$ are contiguous.

Figure 4:
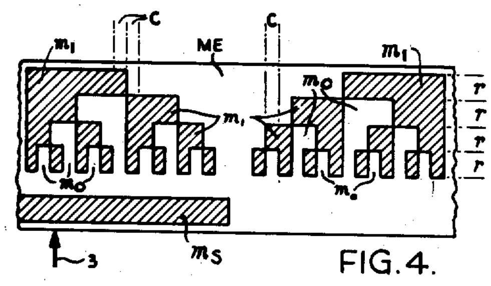
Figure 4 shows the same pattern but with the markings coalesced in both the vertical and horizontal directions.

Fig. 4 illustrates a still further alternative arrangement of the markings $m_0$, $m_1$ in which both the columns $c$ and the rows $r$ are made contiguous.

It will be appreciated that if, in scanning the pattern of Fig. 4 a scanning beam starts to traverse along boundaries between columns of markings, owing to the finite size of the light beam and to a possible relative deviation during the course of the scan, outputs from the photocell may be obtained in digit positions where, in fact, no output is required, and vice-versa;

i. e. errors may occur. For example, if the scan at the position 3 deviates slightly to the left there is a possibility of generating an output supposedly corresponding to the binary number 1101 which is in error by more than one unit. It will be seen that, in this case, in traversing a boundary to the left of a column representing an odd number the error cannot be greater than one unit, while in traversing right hand boundaries of such columns errors of larger magnitude can arise.

Figures 5, 6, 7, 8, 9, 10:
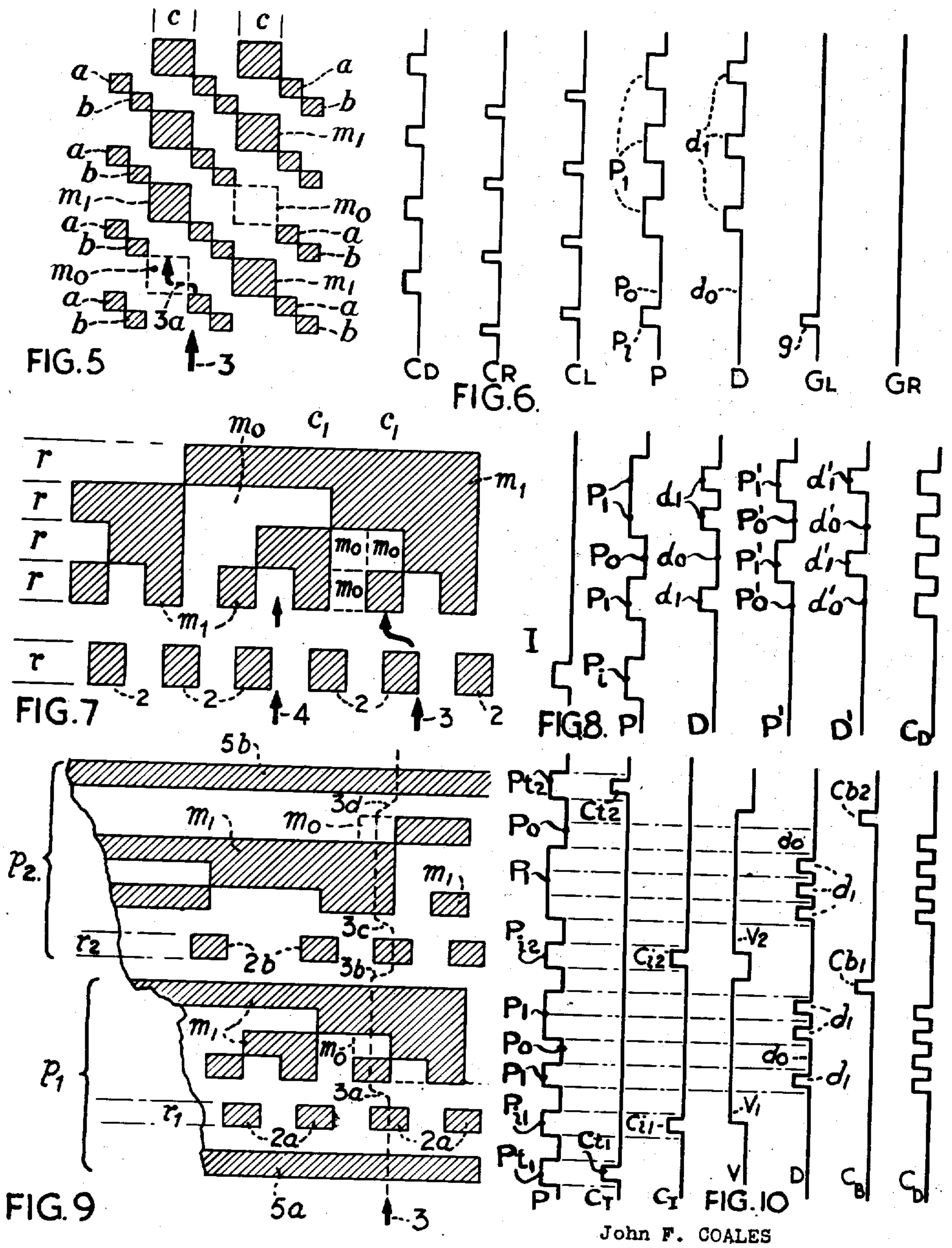
Figure 5 shows a portion of the pattern of Figure 1 having subsidiary markings for correcting the traverse with respect thereto of a scanning light beam forming part of the reading means.
Figure 6 illustrates certain waveforms associated with the pattern shown in Figure 5.
Figure 7 illustrates a modification of the pattern of Figure 4 showing an alternative method to that of Figure 5 for correcting the traverse of the scanning beam with respect thereto.
Figure 8 illustrates certain waveforms derived from the pattern of Figure 7.
Figure 9 shows a pattern consisting of two separate sets of markings, each set representing a different mathematical function of the same variable and arranged in the manner of Figure 7 for correcting the traverse of the scanning beam with respect thereto.
Figure 10 illustrates certain waveforms derived from the pattern of Figure 9.

Figure 5 illustrates one form of pattern by the use of which the chance of such erroneous outputs is substantially reduced or eliminated. In this pattern, the digit markings $m_0$ and $m_1$ are discrete in the manner illustrated in Fig. 1 and have subsidiary control markings *a*, *b* associated therewith at diagonally opposite corners. Each control marking *a*, *b* is of a length, measured in the direction of scan as indicated by the arrow 3 equal to one-half the spacing between adjacent rows *r* whilst its width is equal to one-half the spacing between adjacent columns *c*.

If the scan starts to traverse along, or during traverse becomes deviated to, a path near the edge of a column *c* the scanning light beam will fall upon one or more of the control markings *a*, *b*, the former being scanned if the deviation is to the right and the latter being scanned if the deviation is to the left. The resultant photocell output pulses are utilised to gate clock pulses derived from the clock pulse train generator to a beam deflection circuit which applies a correcting lateral deflection potential to the X-plates of the cathode ray tube in the sense for deflecting the scanning beam towards the centre-line of the column *c* being scanned. The chance of an error in the resultant digital output is thus substantially reduced or eliminated.

Fig. 6 shows the various waveforms associated with the pattern of Fig. 5. The waveform $C_D$ represents the digit clock pulse waveform generated by the clock pulse train generator, while the waveforms $C_L$, $C_R$, represent left and right deflection pulse waveforms, respectively, which are also derived from the clock pulse train generator. P represents the photocell output waveform, which consists of a left deflection gate pulse *Pl* and three digit gate pulses $P_1$ in the second, third and fourth significant places respectively. Since there is a digit marking $m_0$ in the first significant place on the scan line indicated by the arrow 3*a*, no gate pulse occurs at P. The resultant left gate waveform is as shown at $G_L$ having a single left deflection pulse at *g* which is operative to deflect the scanning beam SB to the left, at 3*a*, whilst the resultant right gate waveform exhibits no deflection pulses and is not operative to deflect the scanning beam SB. The resultant digit output waveform is shown at D, and consists of zero "pulse" $d_0$ at the first significant marking $m_0$ and digit output pulses $d_1$ at the second, third and fourth significant places $m_1$. The binary number transmitted is thus 1110, or 14 on the decimal scale.

Fig. 7 shows an alternative method of correcting the position of the scanning beam on a pattern. In this figure, the pattern of markings $m_0$, $m_1$ is in the form illustrated in Fig. 4 and the greatest chance of serious error in output signal will occur if the scanning light beam traverses along the right-hand edge of alternate columns such as $c_1$ representing odd numbers. A row $r_1$ of initiator markings 2 is therefore arranged below the pattern, the centre line of each marking 2 being coincident with the right-hand edge of the column $c_1$ immediately above it representing an odd number. If the scanning beam is positioned to the right of the centre line of the column $c_1$ of markings to be scanned, the photocell output P (Fig. 8) contains a pulse $P_1$ which serves to gate an initiator clock pulse I from the pulse train generator to a correction circuit for deflecting the scanning beam through one column pitch. This condition is indicated by the arrows, 3, 3*a*, in the figure. If, however, the scanning beam is located as at 4, no initiator marking 2 is encountered prior to the scanning of the pattern markings $m_0$, $m_1$, and hence no correction signal is applied from the photocell to alter the position of the beam.

Fig. 8 shows the initiator pulse I which occurs at the instant when the beam is traversing the row $r_1$ of initiator markings. The waveform P represents the output derived from the photocell when the beam scans the path 3, 3*a*, whilst the waveform $P_1$ represents the output from the photocell when the beam scans the path 4. The corresponding digit pulse outputs D, $D_1$ represent the binary numbers 1101 and 1010 which correspond to the decimal scale numbers 13 and 10 respectively.

Fig. 9 illustrates a pattern consisting of two different sets of markings $P_1$, $P_2$ respectively together with timing markings 5*a*, 5*b* and two rows $r_1$, $r_2$ of initiator markings 2*a*, 2*b* respectively, and Fig. 10 shows the associated waveforms. In the latter figure, the waveform P represents the photocell output, the waveform $C_T$ the time base speed control circuit waveform, $C_I$ the initiator markings waveform, $C_B$ the beam deflection voltage switch-off waveform, V the beam deflection voltage waveform, and D the digit output waveform which is to be transmitted. The beam SB always traverses a timing marking 5*a* or 5*b* at the beginning or end respectively of a scanning sweep, the marking 5*a* producing a gating pulse $P_{t1}$ in the photocell output P which serves to correct—in a manner to be described with reference to Fig. 14—the instant of start of a scanning sweep, averaged over a number of scans, whilst the marking 5*b* produces a gating pulse $P_{t2}$ in the photocell output P which serves to correct the speed of scan, again averaged over a number of scans, so that the beam timing is continuously under control by the pattern $P_1$, $P_2$ itself.

Figure 13:
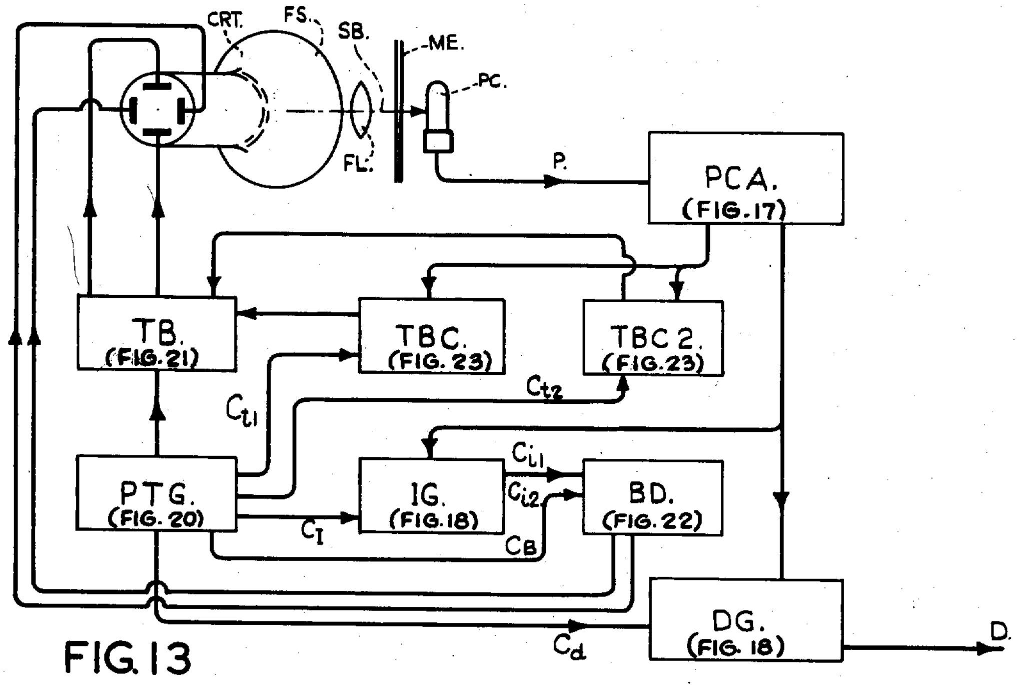
Figure 13 is a block diagram of a circuit designed for use with a pattern such as that shown in Figures 9 and 10.

In order to effect the desired control of the start and speed of the scan sweep, it is preferred to arrange that the pulses $P_{t1}$ and $P_{t2}$ are differentiated, in the time base control circuit TBC of Fig. 13, so as to produce a short positive-going pulse at the commencement of each of the said pulses and a short negative-going pulse at the ends thereof. The timing clock pulses $C_{t1}$ and $C_{t2}$ are also differentiated in the same manner, the positive-going pulses which result normally appearing later in time than those derived from the pulses $P_{t1}$ and $P_{t2}$, respectively, and the resulting negative-going pulses normally appearing earlier in time than those derived from the pulses $P_{t1}$ and $P_{t2}$, respectively. Under these conditions, the time-base start circuit exercises no correction on the time-base circuit. If, however, the start of a beam scan is retarded, the positive-going pulse derived from the pulse $P_{t1}$ or $P_{t2}$ will tend to coincide in time with the positive-going pulse derived from the pulse $C_{t1}$ or $C_{t2}$, respectively, whereas the corresponding negative-going pulses will tend to separate more in time. On the other hand, if the start of a beam scan is advanced, it is the negative-going pulses derived from the pulses $P_{t1}$ and $C_{t1}$ (or $P_{t2}$ and $C_{t2}$) which tend to coincide in time while it is the corresponding positive-going pulses which tend to move to a greater distance apart in time. The time-base control circuit utilises the resulting preponderance of positive-going signal, or negative-going signal, as the case may be, to shift the beam scan in the direction of scan so that it is advanced or retarded as necessary. These signals are also utilised in the appropriate manner to vary the slope of the time-base wave and thus to speed up or slow down the scanning sweep as required.

After traversing the first timing marking 5*a*, the scanning beam traverses a first row $r_1$ of initiator markings 2*a*. These markings are arranged in the same manner as the initiator markings 2 in Fig. 7 to be encountered by the scanning beam SB should it lie on a path where there is a chance of error arising in the photocell output P.

Such a path is indicated by the arrow 3 in Fig. 9, and the markings 2*a* are operative to cause a deflection of the scanning beam. In the example shown, the deflection is approximately one column pitch, and is to the left.

If, as shown, the beam then strikes one of the initiator markings 2*b* in the second row $r_2$, another initiation gate pulse $P_{i2}$ is produced in the photocell output which gates a second initiator clock pulse $C_{i2}$. This pulse goes to the beam deflection circuit which then applies a second left deflection bias voltage $V_2$ to the X-plates of the cathode ray tube to deflect the scanning beam SB through approximately one column pitch to the left as shown at 3*c*, this voltage $V_2$ being maintained, as before, for the period of scan of the second pattern $P_2$. The voltage $V_2$ is again removed after this pattern has been scanned.

The provision of two rows $r_1$, $r_2$ of initiator markings in the pattern of Fig. 9 may be thought desirable as a precaution against relative displacement of the scanning beam and the pattern during the period of scan of pattern $P_1$. It will be appreciated that a multiple pattern such as that shown in Fig. 9 may comprise individual patterns representing more than two functions, and each may contain any desired number of digits. It may, however, not always be necessary to interpose initiator markings such as 2*b* between adjacent patterns.

Figure 13 shows in block diagram form a circuit which embodies the principles of operation described above in connection with Figures 9 and 10. A cathode ray tube CRT is connected to a time-base circuit TB so that the spot on the fluorescent screen FS of the tube is deflected across the screen at uniform speed in a straight line. The scanning beam SB is focussed by a lens system FL on to a movable pattern of markings ME arranged in any desired way—for example, as shown in Fig. 9. The time-base voltage is synchronised by trigger pulses received from a clock pulse train generator and distributor circuit PTG, whilst the output from the photocell PC is fed to an amplifier PCA whose output P is in turn fed to a digit pulse gating circuit DG. The clock pulse trains generated by the circuit PTG are also distributed to the digit pulse gating circuit DG so that the output D (Fig. 10) therefrom is in the form of discrete digit pulses $d_0$, $d_1$ whose sequences correspond to respective sequences of the markings scanned by the beam SB, and represent on the binary scale the numbers 13 and 7 when the scanning beam sweeps the path 3, 3*a*, 3*b*, 3*c* of Fig. 9.

The pulse train generator PTG includes a known form of pulse distributor circuit having a plurality of output channels, one for each possible significant place on the pattern. The distributor executes a complete cycle of distribution operations for each sweep of the scanning beam SB. Some output channels from the distributor are commoned, as for example the channels feeding the digit gate DG and the channels feeding the initiator gate IG. The initiator gate IG receives the output waveform P (Fig. 10) from the amplifier PCA which may include initiator gate pulses—as shown in $P_{i1}$ and $P_{i2}$ in Fig. 10—occurring at instants when the distributor feeds clock pulses to the initiator gate. When this occurs, the initiator gate IG passes a clock pulse $C_{i1}$ from the distributor to a beam deflection circuit BD which applies a left deflection voltage $V_1$ to the X-plates of the cathode ray tube. This voltage is maintained for the full width of the pattern $P_1$. At the end of the period of scan of this pattern by the beam SB, the beam deflection circuit BD receives a clock pulse $C_{B1}$ from the distributor and removes the beam deflection voltage $V_1$ so that the beam is returned at 3*b* to its original path.

The output P from the amplifier PCA is also fed to the time-base start control circuit $TBC_1$ and to the time-base speed control circuit $TBC_2$, the outputs from both being connected to the time-base circuit TB. The start control circuit $TBC_1$ serves to alter the longitudinal shift on the scan deflection and is operated if the scanning beam SB falls on the first timing marking 5*a* at the incorrect instant. The speed control circuit $TBC_2$ determines the slope of the time-base wave, and so serves to speed up or slow down the scanning sweep according to whether, on the average of a number of scans, the scanning beam SB strikes the final timing marking 5*b* early or late, as already described.

Figure 14:
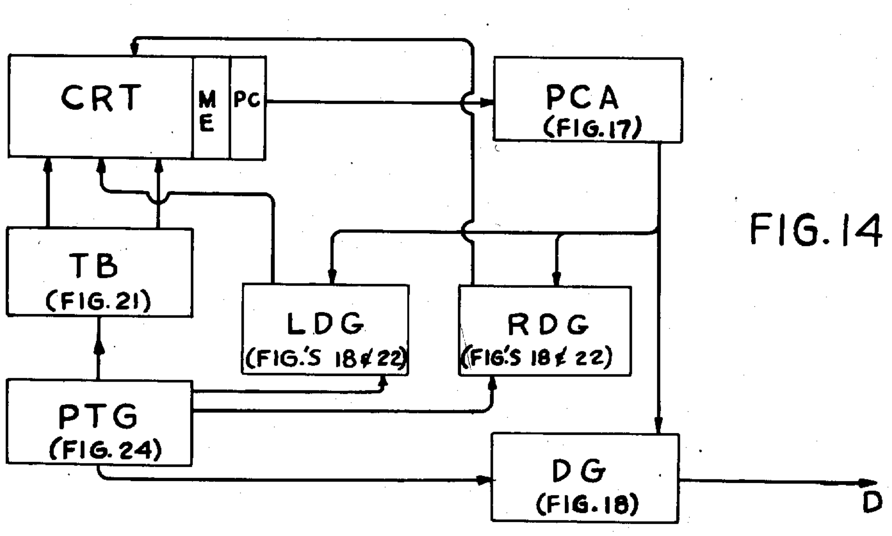
Figure 14 is a block diagram of a circuit designed for use with a pattern as shown in Figures 5 and 6 for preventing the transmission of a wrong number.

Figure 14 shows in block diagram form a circuit for use with a pattern of the kind shown in Figures 5 and 6. In the diagram, the cathode ray tube CRT, the movable pattern ME, and the photocell PC are shown as a single block for convenience of drawing.

The output from the photocell amplifier PCA is fed to a digit gate DG and serves to gate digit pulses received from the pulse train generator PTG in accordance with the digit markings $m_1$ in Figure 5. When the path indicated by the arrows 3, 3*a* in Figure 5 is being scanned, the binary number 110 is generated and appears in the output from the digit gate as the waveform D (Fig. 6) the space $d_0$ indicating the digit 0 and the pulses $d_1$ indicating the digit 1.

The output from the photocell amplifier PCA is also fed to a left deflection gate LDG and a right deflection gate RDG. The left deflection gate LDG receives a train of pulses indicated in Figure 6 by the waveform $C_L$ whilst the right deflection gate receives a waveform as shown at $C_R$. The waveform $C_L$ consists of pulses occurring at regular intervals at the beginning of each period between successive pulses in the digit clock waveform shown at $C_D$ whilst the waveform $C_R$ consists of similar pulses occurring towards the end of each period between successive pulses in the waveform $C_D$.

If the scanning beam SB strikes a left deflection marking $a$ on the pattern of Figure 5, a gating pulse occurs in the output P from the photocell amplifier PCA at the instant when a pulse of the waveform $C_L$ arrives at the left deflection gate LDG. This gate is thus opened to allow the passage of this pulse in the train $C_L$ which is then operative to apply a left deflection voltage to one of the X-plates of the cathode ray tube CRT. Similarly, should the scanning beam SB strike a right deflection marking $b$ in Figure 5, a pulse of the train $C_R$ is gated by the right deflection gate RDG to apply a right deflection voltage to the other X-plate of the cathode ray tube CRT. The scanning beam SB is thus deflected laterally for a distance equal to one half the width of a column $c$ so that it correctly traverses the markings $m_0$, $m_1$.

It will be understood that separate pulse train generators PTG may be used to generate the respective waveforms $C_L$, $C_R$, $C_d$, the separate generators being kept in step by any known method.

Figure 15:
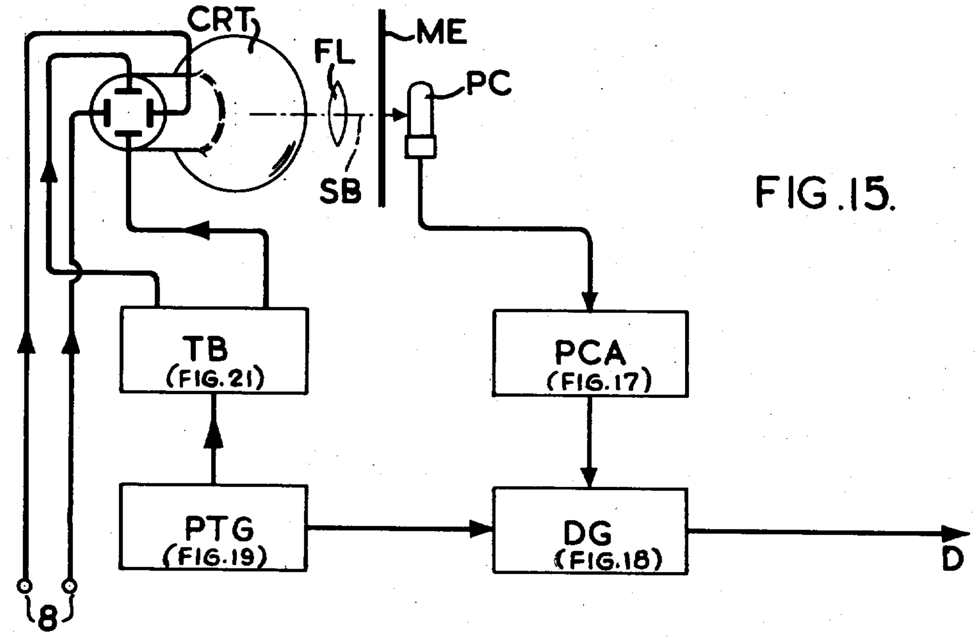
Figure 15 is a block diagram of a circuit arrangement for generating a digital output representing a function of two independent variables.

Figure 15 illustrates a simple circuit arrangement for providing a digital output corresponding to a function of two independent variables. In this arrangement, the movable pattern ME carries markings corresponding to successive values of a function of one variable—say $f(x)$—and is scanned in the manner described with reference to Figure 11.

The Y-plates of the cathode ray tube CRT are fed with a time-base voltage from the time-base circuit TB in the normal manner whilst the X-plates are connected to another circuit (not shown) at the terminals 8 for producing voltages corresponding to values of a function of an independent variable Y. In the absence of any voltage applied to the terminals 8, the circuit operates to produce an output waveform D from the digit gate DG corresponding to the function represented by the pattern ME. If, however, a voltage is now applied at the terminals 8, the scanning beam SB will be deflected relative to the pattern ME so that the output D is varied in accordance with the function $f(x+y)$. The circuit may, with advantage, be used where $y$ represents small corrections to the variable $x$, although it will be understood that it may be used in all cases where it is required that the digital output D shall represent a function of the algebraic sum of two independent variables.

Any of the forms of circuit described above for the prevention of transmission of a wrong number may be adopted in the circuit shown in Figure 15.

It will be understood that in the case of a pattern representing a function of a variable it may be arranged that some numbers are omitted over some parts of the pattern or some numbers are repeated in consecutive columns $c$. When, however, the means described in connection with Figs. 5 to 10 for avoiding wrong numbers are used, it is necessary that adjacent columns should represent numbers differing by 0 or 1. This can be arranged by providing sufficient steps of the variable in relation to the number of digits representing the function. Alternatively, if it is not convenient to provide this sufficiency of steps of the variable, or if the function is discontinuous, so that some adjacent columns $c$ represent numbers differing by more than one, the initiator marking 2 of Fig. 7 may be reduced in width by a factor of two and twice the number of such markings 2 may be used, the centre-line of each marking 2 being coincident with an edge of a column $c$ and all such edges having markings 2 opposite them.

In scanning the patterns of Figs. 1, 1$a$ and 3, if the scanning spot size is small compared with the width of the digit markings $m_0$, $m_1$ and if the scanning beam SB does not deviate appreciably from its correct direction, no wrong numbers will arise and it will not be necessary to adopt the correction means described in connection with Figs. 5 to 10, nor to arrange for adjacent columns to represent numbers differing by no more than unity. Such means may, however, be employed as a precaution, if the spot size is small, and will be desirable if the spot size is comparable with the width of the markings.

Figure 16:
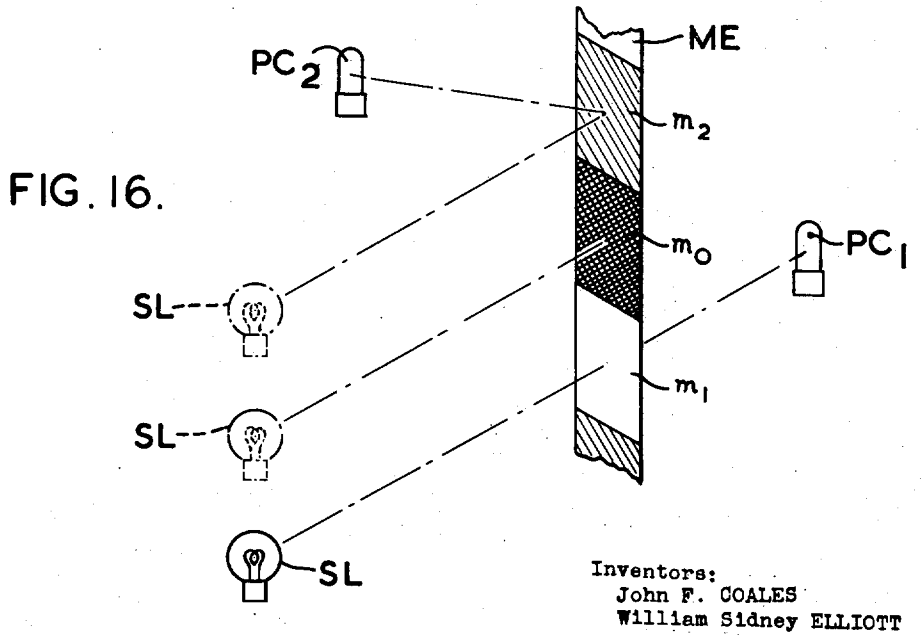
Figure 16 illustrates schematically a possible form of markings for use in a data transmission system operating on the ternary scale.

Fig. 16 shows diagrammatically a possible form of markings for deriving digital data in the ternary scale or scale of three. In this scale, there are three digits, 0, 1, 2, each of which can be represented by a corresponding marking $m_0$, $m_1$, $m_2$ having a distinctive characteristic representing its respective digit value. Thus, as shown in the figure, the movable pattern ME is of a generally light-absorbent nature, and is formed with transparent markings $m_1$ and reflecting markings $m_2$ representing, say the digit values 1 and 2. Further markings $m_0$ of a light-absorbent nature are formed to represent, say, the digit value 0. The movable pattern ME is illuminated by a scanning beam lamp SL, and photocells $PC_1$ and $PC_2$ are located on opposite sides of the pattern. The photocell $PC_1$ receives light transmitted through the transparent markings $m_1$ while the photocell $PC_2$ receives light reflected from the reflecting markings $m_2$. The output pulses from the photocell $PC_1$ represent the digit of value 1 whilst the output pulses from the photocell $PC_2$ represent the digits of value 2 in the pattern. For ease of illustration, the scanning beam lamp SL is shown in three alternative positions to indicate relative movement between the said lamp and the pattern ME. It will be understood that only one lamp SL would be used in a series system to illuminate both photocells $PC_1$ and $PC_2$ whilst the pattern ME would be traversed in the appropriate direction with respect thereto. In a parallel system employing three different types of markings $m_0$, $m_1$, $m_2$, there would be a lamp SL and a slit to illuminate the full height of the pattern and as many of each of the photocells $PC_1$ and $PC_2$ as there are digits in the pattern.

The arrangement of Figure 16 may alternatively be used as a binary digital system in which control markings—for example, the markings $m_2$—for indicating instructions (such as beam shift) to the apparatus are of a distinctive nature from markings $m_0$, $m_1$ representing digits in the pattern. Alternatively, markings $m_1$ and $m_2$ can be used to distinguish both binary digit values 0 and 1 from the background of the pattern.

Details of the circuits represented as block diagrams in certain of the preceding figures will now be described, these circuits merely being examples chosen from the many known arrangements which will perform the required functions as will be obvious to those skilled in the art, and not in themselves constituting part of this invention.

Figure 17:
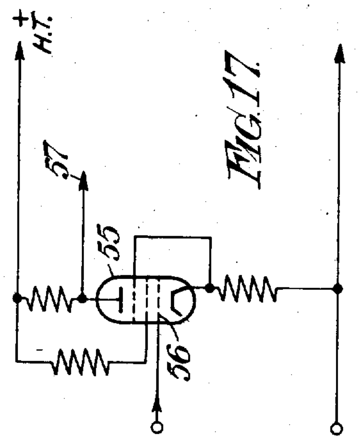
Figure 17 illustrates a known circuit suitable for use as the photo-cell amplifier which is indicated in block form at PCA in Figs. 11, 13, 14 and 15.

The photo-cell amplifier represented by the PCA block is shown in Fig. 17 as a direct coupled pentode amplifier, the pentode 55 having its control grid 56 fed with the output from the photocell and the output from this amplifier being taken from the anode at 57.

The digit pulse gate represented by the block

Figure 18:
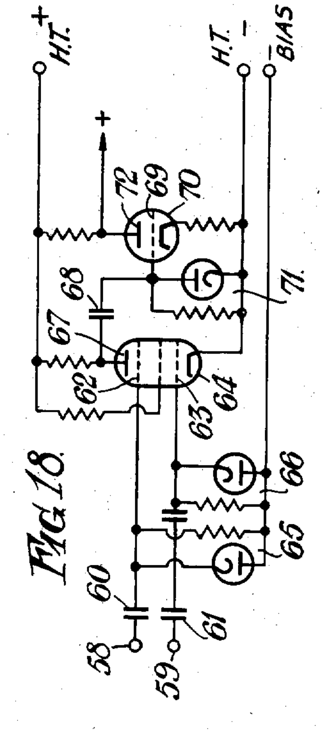
Fig. 18 illustrates a known circuit suitable for use as the digit pulse gate which is indicated in block form at DG in Figs. 11, 13, 14 and 15, and also as the gate shown in block form at IG in Fig. 13 with an appropriate change in an input connection.

DG in the respective figures may have a circuit of the form shown in Fig. 18. In this circuit, two inputs are supplied at terminals 58 and 59 which are connected through respective condensers 60 and 61 to the suppressor and control grids 62 and 63 respectively of a short suppressor base pentode 64. Each of these grids is negatively biased, through diode D. C. restoring circuits indicated at 65 and 66, respectively, so that anode current can only flow when both grids 62 and 63 are simultaneously driven positive relative to their quiescent potentials.

The output from the pentode 64 is taken from its anode 67 through a condenser 68 to the control grid 69 of an inverter triode 70, a further diode D. C. restoring circuit 71 being connected between the grid 69 and H. T. negative. The final output of the gate is taken from the anode 72 of the inverter triode 70.

The inputs supplied at terminals 58 and 59 are respectively derived from the photo-cell amplifier PCA (Fig. 17) and the clock pulse train generator PTG (described in detail below) as positive-going pulses and only when there is a pulse in each input in the same pulse period will the pentode 64 conduct. There results a negative-going pulse at the anode 67 which is converted by the inverter triode 70 into a positive-going pulse at its anode 72 from which the output of the gate is derived. The gate thus operates to deliver a pulse to the output circuit indicated at D in Figs. 11, 13, 14, and 15 only when a pulse from the photo-cell amplifier coincides in time with a clock pulse from the pulse train generator. Consequently, the output D in the figures referred to represents the wanted signals from the element ME carrying the markings being scanned.

Figure 19:
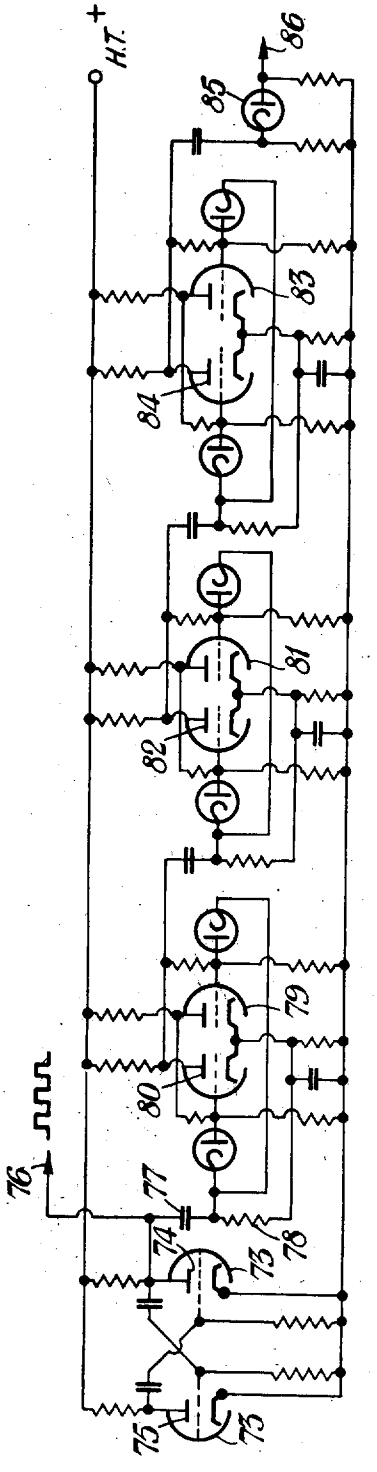
Fig. 19 illustrates a known circuit suitable for use as the single-output clock pulse train generator indicated in block form at PTG in Figs. 11 and 15.

Fig. 19 shows a typical circuit for use as the pulse train generator represented by the block PTG in Figs. 11 and 15, consisting of a free-running multivibrator 73 in the form of a double triode having anodes 74 and 75 interconnected in the conventional manner. The output from the multivibrator 73 is taken off the anode 74, at 76, the said output consisting of a train of substantially square-shaped positive-going pulses as indicated.

In order that a trigger pulse for operating the time base circuit (yet to be described in detail) may be derived from this train of pulses the anode 74 is also coupled through a condenser 77 and resistance 78 to the first of a series of frequency divider double triodes 79, 81 and 83, it being understood that many more than the three stages shown are normally required.

The double triode 79, as is known, when supplied with the pulse train shown at 76, will produce at its one anode 80 a secondary train of pulses having a repetition frequency equal to one half of the repetition frequency of the pulses in the input pulse train.

Similarly, the output from the anode 82 of the second frequency divider stage is a train of pulses having a repetition frequency equal to one half of that of the input derived from the anode 80 of the first frequency divider 79 and the output from the anode 84 of the third frequency divider stage 83 is a train of pulses having a repetition frequency equal to one half of that of the input derived from the anode 82 of the second stage 81. The anode 84 of the final frequency divider stage 83 is connected through a diode 85 to an output channel 86. The output at 86 consists of a train of peaked negative trigger pulses having a repetition frequency equal to $\frac{1}{2^3}$ of that of the clock pulses produced by the multivibrator 73. Any number of frequency divider stages may be used, the final output having a pulse repetition frequency which is $\frac{1}{2^n}$ of that of the clock pulse train shown at 76, where $n$ is the number of frequency divider stages fed from the multivibrator 73.

Figure 20:
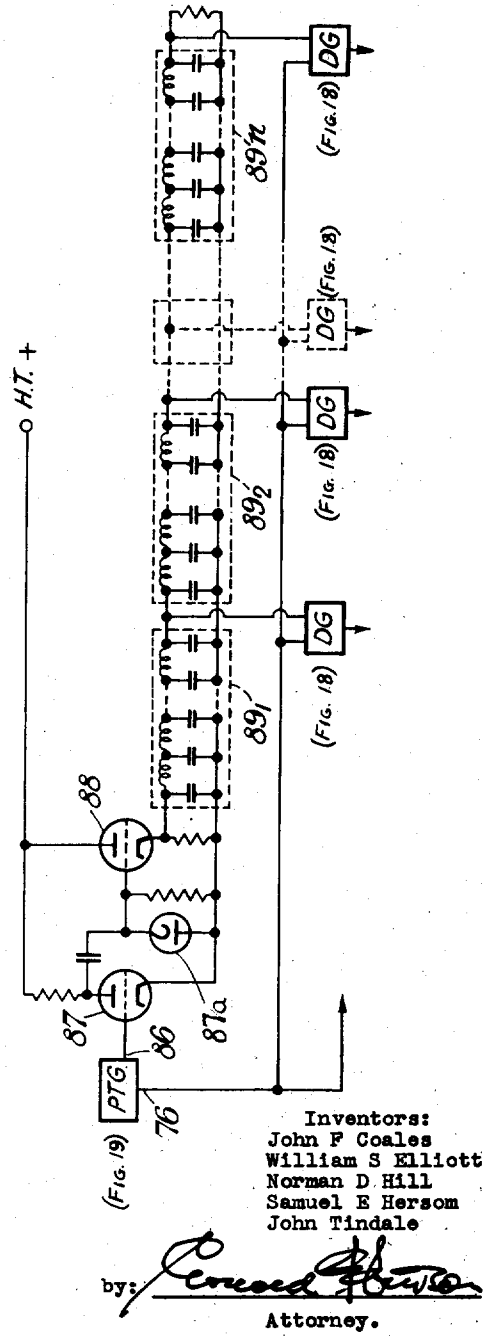
Fig. 20 illustrates a known circuit suitable for use as the clock pulse train generator having multiple outputs which is shown in block form at PTG in Fig. 13.

Fig. 20 shows an extension of the circuit of Fig. 19 which renders it suitable for use as the pulse train generator represented by the block PTG in Fig. 13 where it is required to have a number of outputs in each of which pulses will occur at definite time intervals in relation to the final frequency divided output derived from the circuit illustrated in Fig. 19. In Fig. 20 the output 86 from the pulse train generator PTG of Fig. 19 is inverted and squared by a combination comprising the triode 87 and diode 87*a* before being fed by way of a cathode follower 88 into a delay chain composed of series-connected delay lines $89_1$, $89_2$ . . . $89_n$. Each delay line, such as $89_1$, is operative to delay the transmission of a pulse therethrough by one digit time, i. e. the period of one cycle of the output derived at 76 from the pulse train generator PTG of Fig. 19. The output from each delay line $89_1$ . . . $89_n$ is fed as one of the inputs to a separate digit gate DG which is arranged as shown in Fig. 18. The other input to the digit gate DG is composed of the train of clock pulses derived from the output 76 of the pulse train generator PTG and, hence, the output from each digit gate DG represents a series of rectangular pulses bearing a selected fixed time relationship to the pattern of markings being scanned.

Figure 21:
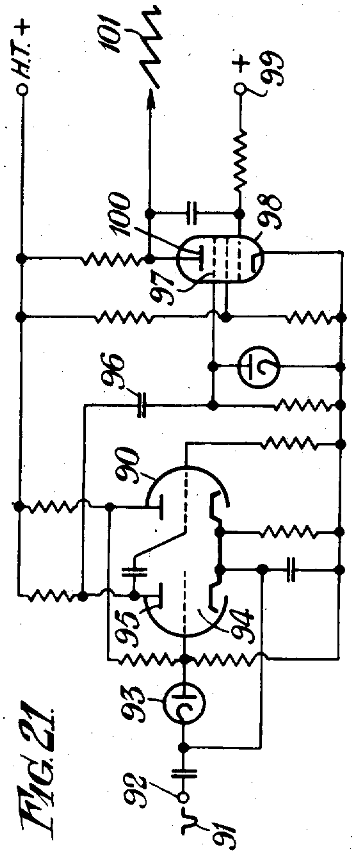
Fig. 21 illustrates a typical known time base circuit for use where indicated in block form at TB in Figs. 11, 13, 14 and 15.

Fig. 21 illustrates a time base circuit such as is represented by the block TB in Figs. 11, 13, 14, and 15. This circuit comprises a double triode 90 arranged to function in the known manner as a "one shot flip-flop." A negative-going trigger pulse, indicated at 91, derived from the frequency divided output 86 of the clock pulse generator shown in Fig. 19 is applied to the input terminal 92 of the circuit and is fed through a diode 93 to one grid 94 of the flip-flop 90 to cause the execution of one complete cycle of anode voltage changes therein whereby a positive-going rectangular pulse is produced at the anode 95. This pulse is fed as a gating wave, through a condenser 96, to the suppressor grid 97 of a Miller integrating pentode 98 the control grid of which is connected in the normal fashion, through a grid leak, to a supply of positive potential marked 99. An output is derived from the anode 100 in the form of a saw-tooth wave form as indicated at 101. This output has a frequency which is controlled by the repetition frequency of the input trigger pulses 91. The speed of linear rundown of the anode potential of the pentode 98, during the period of application of the gating wave, may be varied by adjusting the potential of the point 99 to which the grid leak is returned.

Figure 22:
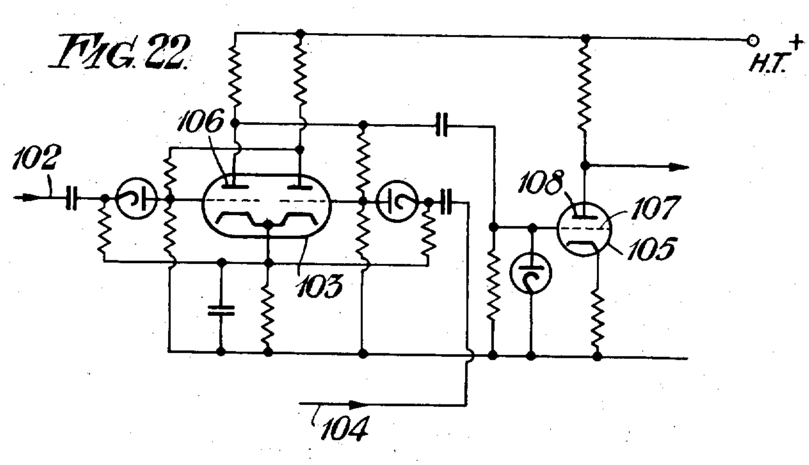
Fig. 22 shows a known circuit which is suitable for use as the beam deflection circuit indicated in block form at BD in Fig. 13.

Fig. 22 shows a suitable circuit arrangement for use as the beam deflector circuit represented by the block BD in Fig. 13. The input channel 102 receives an output pulse from the initiator gate represented by the block IG in Fig. 13 and this latter gate comprises a digit gate circuit as shown in Fig. 18 in which one input 58 or 59, is the output from the photo-cell amplifier PCA, as before, whereas the other input is the output from an appropriate digit gate DG of the circuit shown in Fig. 20 (instead of the clock-pulse train). It will be appreciated that the initiator gate will deliver a pulse to the input channel 102 of Fig. 22 only when there is coincidence in time of a pulse from the photo-cell amplifier and a pulse from the selected digit gate of Fig. 20. The pulse from the initiator gate IG operates to set a direct-coupled flip-flop 103 which is in turn reset by an appropriate pulse fed to the input 104 during the next minor cycle period. When the flip-flop 103 is set, the current through an auxiliary triode 105 is varied, due to the connection from the anode 106 of the flip-flop to the grid 107 of the triode, to a predetermined extent sufficient to vary the potential on its anode 108 by an amount which will, when applied to the appropriate deflecting plate of the cathode ray tube shown at CRT in Fig. 13, deflect the beam in this tube laterally through a distance approximately equal to one spot diameter on the screen thereof.

Figure 23:
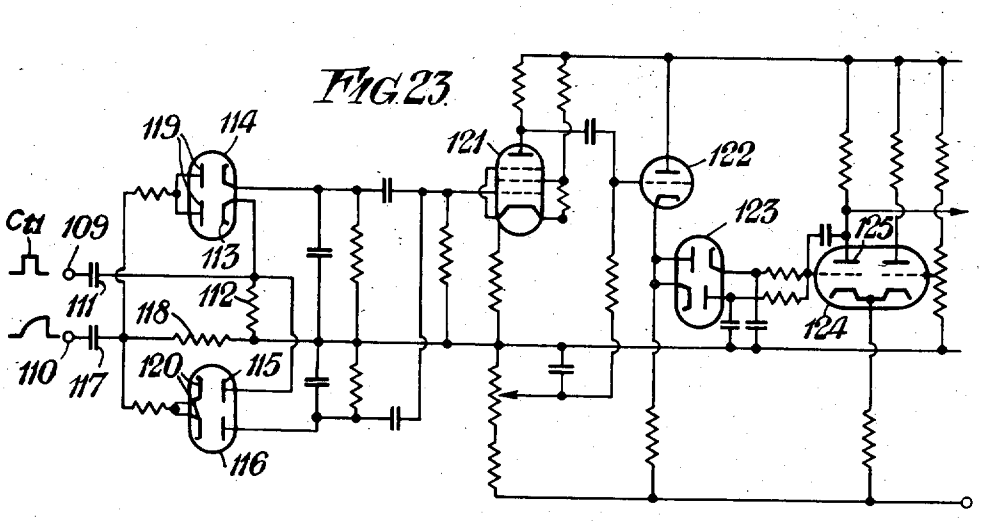
Fig. 23 illustrates a known circuit suitable for use as the starting time control circuit indicated in block form at TBC1 in Fig. 13 and also as the scan speed control circuit indicated in block form at TBC2 in Fig. 13, with an appropriate transposition of the input connections.

Fig. 23 shows a circuit diagram which is suitable for use in both the blocks TBC1 and TBC2 of Fig. 13, the input and output connections being suitably adjusted in either case, as will be indicated. Considering first the circuit as used at TBC1, a clock pulse $C_{t1}$ derived from an appropriately selected digit gate DG of Fig. 20, this pulse being represented on the wave form $C_T$ in Fig. 10, is fed to one input channel 109. The other input channel 110 receives the output from the photo-cell amplifier of PCA of Fig. 13 (shown in detail in Fig. 17). The input $C_{t1}$ is differentiated by the capacity resistance network 111, 112 to produce a short positive-going pulse corresponding with the start of the pulse $C_{t1}$ and a short negative-going pulse corresponding with the end of the pulse $C_{t1}$. These pulses are simultaneously applied, in each case, to the one cathode 113 of a double diode 114 and to one anode 115 of a similar double diode 116. At the same time, the input from the photo-cell amplifier PCA on the channel 110 is similarly differentiated by the capacity-resistance network 117, 118, and the resultant positive-going and negative-going pulses are applied to both anodes 119 of the double diode 114 and to both cathodes 120 of the double diode 116.

If the output from the photo-cell amplifier PCA of Fig. 13 is early in relation to the pulse $C_{t1}$, the negative-going pulse resulting from the differentiation of this output coincides in time with the negative-going pulse derived from the differentiation of the input $C_{t1}$ so that the negative output from the double diode 116 is of greater magnitude than the positive output from the double diode 114. On the other hand, if the output from the photo-cell amplifier PCA of Fig. 13 is late in relation to the pulse $C_{t1}$, the reverse conditions are obtained. If the output from the photo-cell amplifier PCA occurs in the correct timed relation to the pulse $C_{t1}$, the positive-going and negative-going differentiated pulses resulting from that output will be symmetrically disposed in time about the corresponding differentiated pulses derived from the pulse $C_{t1}$.

The positive and negative outputs from the diodes 114, 116 are mixed, amplified by a pentode 121 and then separated and lengthened by the circuits associated with a triode 122 and double diode 123. The mixed output from the double diode 123 is then integrated by the Miller feed-back circuit associated with the double triode amplifier 124 and the resultant output potential at the anode 125 of this double triode is applied to the beam deflecting plates of the cathode ray tube CRT to displace the trace in the direction of scan.

When this circuit is used at TBC2 in Fig. 13, the input 109 receives the clock pulse $C_{t2}$ on the wave form $C_t$ in Fig. 9, instead of the pulse $C_{t1}$ as just described, and the input 110 receives the output from the photo-cell amplifier PCA as before. The components of the circuit function as already described but the output taken off the anode 125 of the double triode 124 is utilized to govern the potential of the adjustable positive supply at 99 in the time base circuit TB shown in detail in Fig. 21. Thus the scanning sweep of the beam in the cathode ray tube CRT may be speeded up or slowed down as required.

Figure 24:
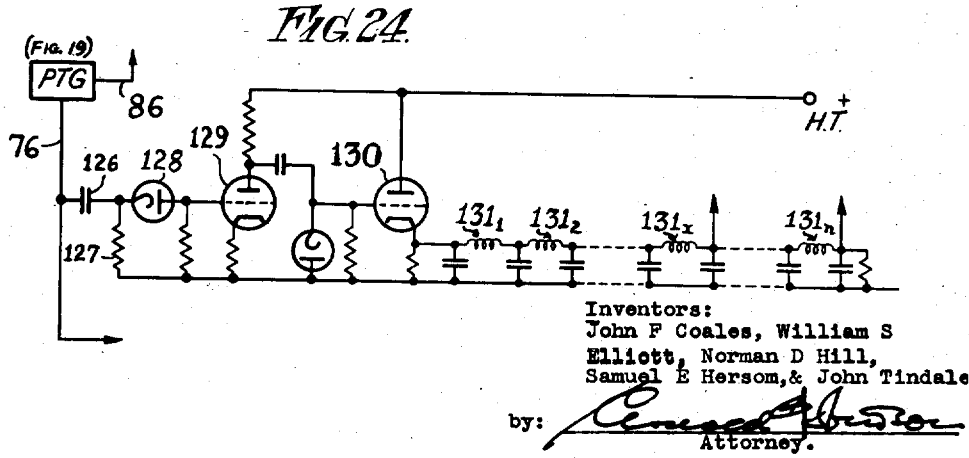
Fig. 24 is a suitable known circuit for use where indicated by the block PTG in Fig. 14.

Fig. 24 shows the circuit for use where indicated by the block PTG in Fig. 14, this including a circuit such as illustrated in detail in Fig. 19 and represented in Fig. 24 by the small rectangle marked PTG (Fig. 19), the outputs 76 and 86 for the clock pulse trains and trigger pulse trains, respectively, being indicated. From the output 76 the clock pulses are supplied by way of a differentiating circuit 126, 127 and a diode limiter 128 to an inverter triode 129 which feeds, through a cathode follower 130, the resulting very short pulses into delay line sections 131, $131_2$ . . . $131_x$, $131_n$ connected in series. Each delay line section produces a delay in the transmission of a pulse therethrough which is very much shorter than the delay produced by the delay line sections in Fig. 20. Since the pulses fed into the delay line in the present case are extremely short the required pulse trains $C_L$ and $C_R$ (refer also to Fig. 6) may be taken off at the appropriate sections (shown as the sections $131_x$ and $131_n$) without further provision.

The circuit represented by the block LDG in Fig. 14 comprises a combination of the circuits shown in detail in Figs. 18 and 22, the beam deflection circuit being connected to follow the digit pulse gate. In this case the output of the beam deflection circuit will control the appropriate deflection plate in the cathode ray tube CRT to produce a lateral deflection of the scanning beam in the appropriate direction. Similarly, the circuit represented by the block LDG in Fig. 14 also comprises a digit pulse gate as illustrated in Fig. 18 followed by a beam deflection circuit as illustrated in Fig. 22. In this case, however, the output of the beam deflection circuit controls the opposite deflection plate in the cathode ray tube CRT so that the scanning beam will be shifted laterally in the opposite sense.

What we claim is:

1. In a digital data transmission system, a freely movable element carrying markings, indicative of its position relative to a datum position according to a predetermined mathematical function, said markings being arranged in columns located side by side in the direction of motion of the element and the markings in each column representing in the binary system of numbers the numerical value of the function at that particular point on the element, a relatively fixed scanning device for continuously scanning the markings in the direction of length of the columns at a given location, means for producing a train of pulses corresponding to the binary number represented by the markings in the column being scanned, a clock pulse generator, means for feeding selected regularly recurrent pulses to the scanning means for determining the instants of commencement of successive scanning operations, means for feeding all the clock pulses to a gating circuit, means for feeding a train of pulses corresponding to the binary number of the column being scanned to the said gating circuit to control the gating operation thereof, and means for transmitting the trains of gated clock pulses to represent binary values of the mathematical function.

2. In a digital data transmission system, the combination of a freely movable element carrying code markings indicative of its position relative to a datum position according to a predetermined mathematical function, said code markings being arranged in columns located side by said in the direction of motion of said element and the code markings in each column representing the numerical value of the function at the related location on the element in the binary system of numbers, a relatively fixed scanning device for continuously scanning the code markings in the direction of the length of the columns at a predetermined scanning location, means responding to said scanning device for producing a train of pulses corresponding to the binary number represented by the code markings in the column being scanned, a clock pulse generator, means for feeding selected regularly recurrent pulses from said generator to said scanning device for determining the instants of commencement of successive scanning operations, means for feeding all of the pulses from said clock pulse generator to a gating circuit, means for feeding the train of pulses corresponding to the binary number of the column being scanned to said gating circuit to control the gating operation of the latter, means for transmitting trains of gated clock pulses from said gating circuit to represent binary values of the mathematical function, initiating markings on said movable element for at least certain of said columns of code markings and displaced in the direction of movement of said element relative to the respective column of code markings to be scanned by said scanning device in the event that the latter is not accurately aligned with a column of code markings, and means responding to scanning of said initiator markings to effect deflection of said scanning device in the direction of movement of said element into alignment with the column of code markings disposed at the scanning location.

3. In a digital data transmission system; the combination according to claim 2, wherein said means responding to scanning of said initiator markings to deflect the scanning device comprises an initiator gate circuit, means for feeding selected regularly recurrent pulses to said initiator gate circuit at intervals corresponding to the location of said initiator markings on said element in the direction of said columns, means for feeding pulses corresponding to the initiator markings to said initiator gate circuit for controlling the gating operation of the latter, means for deflecting said scanning device, and means for feeding the gated pulses issuing from said initiator gating circuit to said deflecting means for controlling the operation of the latter.

4. In a digital data transmission system; the combination according to claim 2, wherein said columns of code markings are spaced apart in the direction of movement of said element, and said initiator markings for said certain columns are disposed at opposite sides of the respective column and displaced relative to each other in the direction of the length of the column.

5. In a digital data transmission system; the combination according to claim 4, wherein said means responding to scanning of said initiator markings to deflect the scanning device comprises first and second initiator gate circuits, means for feeding selected regularly recurrent pulses to said initiator gate circuits at out of phase intervals corresponding to the locations of said initiator markings at the opposite sides of the columns of code markings, means for feeding pulses corresponding to the scanned initiator markings to said initiator gate circuits for selectively controlling the gate operation of the latter, means for deflecting said scanning device in opposed directions, and means for feeding the gated pulses issuing from the selected one of said first and second initiator gate circuits to said deflecting means for controlling the operation of the latter in the corresponding direction.

6. In a digital data transmission system; the combination according to claim 2, further including timing markings on said element at the opposite ends of said columns of code markings to be scanned by said scanning device at the commencement and end of each scanning sweep, means for producing timing pulses corresponding to the scanning of said timing markings, means synchronized with said generator for producing regularly recurrent control pulses which normally are in a predetermined out of phase relationship with respect to said timing pulses and of the same frequency, and means responding to deviations from said predetermined out of phase relationship between said control pulses and timing pulses and to differences in the frequencies thereof for correcting the timing and sweeping speed of said scanning device.

7. In a digital data transmission system; the combination according to claim 2, wherein said columns of code markings are contiguous to each other, and said initiator markings are provided only for the columns having code markings representing odd numbers in the binary system of numbers, said initiator markings being disposed adjacent the ends of the respective columns of code markings at which the scanning of said columns begins and having their centers substantially aligned with side edges of the code markings in the related columns.

8. In a digital data transmission system; the combination according to claim 7, wherein said means responding to scanning of said initiator markings to deflect the scanning device comprises an initiator gate circuit, means for feeding selected regularly recurrent pulses to said initiator gate circuit at intervals corresponding to the location of said initiator markings on said element in the direction of said columns, means for feeding pulses corresponding to the initiator markings to said initiator gate circuit when said scanning device scans said initiator for controlling the gating operation of the initiator gate circuit, means for deflecting said scanning device in the direction from said side edges toward the centers of said code markings, and means for feeding the gated pulses issuing from said initiator gate circuit to said deflecting means for controlling the operation of the latter.

9. In a digital data transmission system, the combination of a freely movable element carrying code markings indicative of its position relative to a datum position according to a predetermined mathematical function, said code markings being arranged in columns located side by side in the direction of motion of said element and the code markings in each column representing the numerical value of the function at the related location on the element in the binary system of numbers, a relatively fixed scanning device for continuously scanning the code markings in the direction of the length of the columns at a predetermined scanning location, means for producing a train of pulses corresponding to the binary number represented by the code markings in the column being scanned, a clock pulse generator, means for feeding selected regularly recurrent pulses from said generator to said scanning device for effecting the successive scanning operations of the latter, a gating circuit, means for feeding all of the pulses from said clock pulse generator to said gating circuit, means for feeding the train of pulses corresponding to the binary number of the column being scanned to said gating circuit to control the gating operation of the latter, means for transmitting trains of gated clock pulses from said gating circuit to represent binary values of the mathematical function, timing markings on said element at the opposite ends of said columns of code markings to be scanned by said scanning device at the commencement and end of each scanning sweep, means for producing timing pulses corresponding to the scanning of said timing markings, means synchronized with said generator for producing regularly recurrent control pulses which normally are in a predetermined out of phase relationship with respect to said timing pulses and of the same frequency, and means responsive to deviations from said predetermined out of phase relationship between said control and timing pulses and to differences in the frequencies thereof for shifting the phase and correcting the speed of scanning of said scanning device.

10. In a digital data transmission system; the combination according to claim 9, wherein said timing pulse producing means is operative to generate timing pulses each of which includes an initial positive portion and a following negative portion and said control pulse producing means is operative to generate control pulses each of which includes an initial negative portion and a following positive portion with the negative and positive portions of said control pulses normally coinciding in time with the positive and negative portions, respectively, of the related timing pulses to substantially cancel each other, and wherein said phase shifting and speed correcting means is operative to shift the phase and correct the speed of scanning of the scanning device in one direction when the positive portions of related control and timing pulses overlap and to shift the phase and correct the speed of scanning in the opposite direction when the negative portions of related control and timing pulses overlap.

JOHN F. COALES.
WILLIAM SIDNEY ELLIOTT.
NORMAN DOUGLAS HILL.
SAMUEL EDWIN HERSOM.
JOHN TINDALE.

References Cited in the file of this patent

UNITED STATES PATENTS

| Number | Name | Date |
|---|---|---|
| 464,513 | Molyneux | Dec. 8, 1891 |
| 2,057,773 | Finch | Oct. 20, 1936 |
| 2,302,009 | Dinkinson | Nov. 17, 1942 |
| 2,318,591 | Couffignal | May 11, 1943 |
| 2,348,535 | Goodale | May 9, 1944 |
| 2,397,604 | Hartley et al. | Apr. 2, 1946 |
| 2,409,229 | Smith, Jr., et al. | Oct. 15, 1946 |
| 2,410,265 | Broido | Oct. 29, 1946 |
| 2,428,990 | Rajchman | Oct. 14, 1947 |
| 2,429,228 | Herbst | Oct. 21, 1947 |
| 2,431,591 | Synder et al. | Nov. 25, 1947 |
| 2,473,691 | Meacham | June 21, 1949 |
| 2,534,369 | Ress | Dec. 19, 1950 |